Jan. 25, 1938.  J. O. NEWELL  2,106,254
VANITY MIRROR DEVICE
Filed May 8, 1937
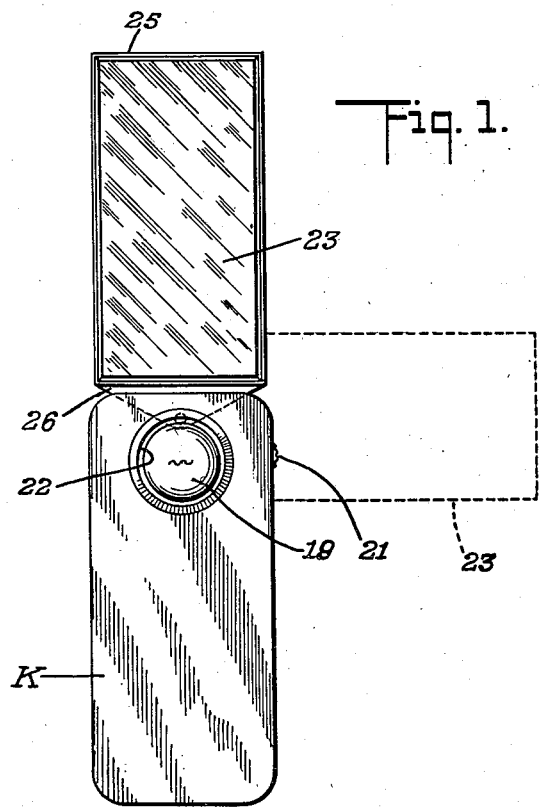
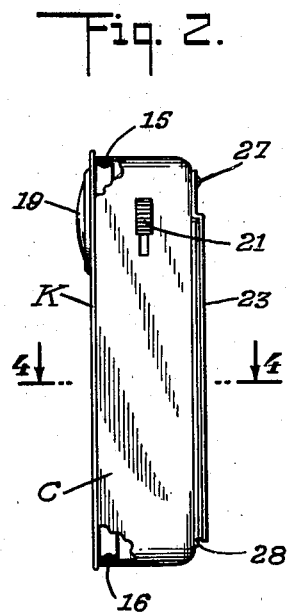
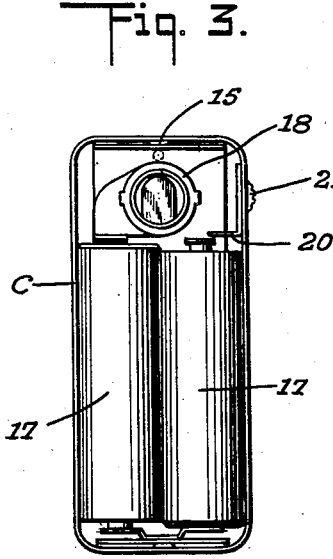
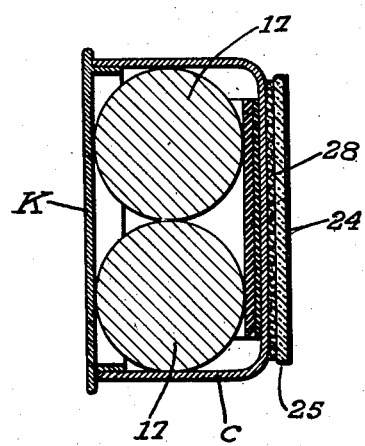
INVENTOR.
Joseph O. Newell
BY
Edwin D. Jones
ATTORNEY.

Patented Jan. 25, 1938

2,106,254

UNITED STATES PATENT OFFICE 2,106,254

VANITY MIRROR DEVICE

Joseph O. Newell, Los Angeles, Calif.

Application May 8, 1937, Serial No. 141,461

4 Claims. (Cl. 88—97)

My invention relates to vanity mirror devices of that size adapted to be carried in the pocket or purse and of that class having an electric lamp for illuminating the face of the user so that it can be clearly seen at night in the mirror to properly apply cosmetics to the face.

It is a purpose of my invention to provide a vanity mirror device of this character in which the casing containing the batteries for the lamp and on which the lamp is carried, has mounted thereon a mirror which is movable from a concealed or folded position on the casing to an exposed or extended position in which it can be adjusted to the most advantageous position for reflective illumination of any particular part of the user's face.

It is also a purpose of my invention to provide a vanity mirror device in which a sheet of felt or other soft fabric is so secured to the casing as to automatically wipe the mirror's reflecting surface clean of powder or other matter under movement of the mirror to or from concealed position. The felt sheet also serves to frictionally retain the mirror in folded position to minimize breakage thereof.

I will describe only one form of vanity mirror device embodying my invention, and will then point out the novel features thereof in claims.

In the accompanying drawing:

Fig. 1 is a view showing in front elevation one form of vanity mirror device embodying my invention in which the mirror is shown in solid lines in one extended position, and in broken lines in another extended position.

Fig. 2 is a view showing the vanity mirror device in side elevation and the mirror in folded position.

Fig. 3 is a view showing the casing of the device with the cover thereof removed.

Fig. 4 is a transverse sectional view enlarged and taken on the line 4—4 of Fig. 2.

In its present embodiment, my invention comprises a sheet metal casing C of rectangular form and of a size to be carried in the pocket or in a purse. This casing has an open front closed by a cover K which is secured on the casing by latches 15 and 16 (Fig. 2).

Within the casing is contained a pair of small dry cells 17 connected to each other and to a socket 18 for a lamp 19 and grounded on the casing so that illumination of the lamp can be controlled by a conventional switch 20 having an operating button 21 on the exterior of the casing. The lamp 19 extends through an opening 22 in the cover K adjacent one end thereof.

A mirror 23 is mounted on the casing C by the provision of a frame consisting of a metal plate 24 formed at its edges with flanges 25 which embrace the edges of the mirror to secure the latter to the plate. As the mirror is oblong in form the plate is of similar form to form a protecting back for the mirror.

At one end the plate 24 is formed with an extension or ear 26 (Figs. 1 and 2) which is offset with respect to the plate and pivotally secured to the back of the casing C by a pin 27. Such a mounting allows the frame as well as the mirror to be swung from a concealed position as shown in Fig. 2 to any extended position or exposed position within an arc of 180°. For example, in Fig. 1, the mirror is shown in solid lines in a position longitudinally alined with the casing C, and in broken lines in a position at right angles to the casing. Manifestly, in any exposed position of the mirror it is in such relation to the lamp 19 that when the latter is illuminated it will illuminate the face of the user so that as reflected in the mirror the face will be clearly visible to allow the proper application of cosmetics thereto. It will be understood that the precise positioning of the mirror is determined by what portion of the face is best reflected by the mirror to apply cosmetics to that particular face portion.

For the dual purpose of securing the mirror and frame in folded or concealed position on the casing, to prevent their swinging accidentally to an extended position, and to maintain the reflecting surface of the mirror clean at all times, I provide a sheet 28 of felt or other suitable material. This sheet is glued or otherwise secured to the back of the casing C, and it is of such thickness as to frictionally retain the mirror in folded position on the casing.

Manifestly, when the mirror is swung to or from concealed position such movement will cause the reflecting surface thereof to be wiped by the sheet 28 to remove powder, finger marks and the like from its surface, thereby at all times maintaining the mirror clean to clearly reflect the face of the user when illuminated by the lamp.

Although I have herein shown and described only one form of vanity mirror device embodying my invention, it is to be understood that various changes and modifications may be made herein without departing from the spirit of my invention and the spirit and scope of the appended claims.

I claim:

1. A vanity mirror device comprising a casing containing illuminating means having a lamp exposed at the front of the casing adjacent one end thereof, a frame pivoted exteriorly of the casing on the rear wall thereof and at the end of the casing adjacent the lamp and movable in a plane parallel to the plane of the casing to occupy folded and extended positions, and a mirror secured to the inner side of the frame for occupying a position between the frame and the back of the casing when the frame is in folded position, the mirror when extended being positioned to receive the illuminated reflection of the face of the user with the casing constituting a hand grip.

2. A vanity mirror device comprising a casing containing illuminating means having a lamp exposed at the front of the casing adjacent one end thereof, a frame pivoted exteriorly of the casing on the rear wall thereof and at the end of the casing adjacent the lamp and movable in a plane parallel to the plane of the casing to occupy folded and extended positions, a mirror secured to the inner side of the frame for occupying a position between the frame and the back of the casing when the frame is in folded position, a sheet of soft material secured to the outer face of the rear wall of the casing and positioned for wiping contact by the mirror when the frame and mirror are moved to folded and extended positions, the mirror when extended being positioned to receive the illuminated reflection of the face of the user with the casing constituting a hand grip.

3. A vanity mirror device comprising a casing containing illuminating means having a lamp exposed at the front of the casing adjacent one end thereof, a frame pivoted exteriorly of the casing on the rear wall thereof and at the end of the casing adjacent the lamp and movable in a plane parallel to the plane of the casing to occupy folded and extended positions, a mirror secured to the inner side of the frame for occupying a position between the frame and the back of the casing when the frame is in folded position, a sheet of soft material secured to the outer face of the rear wall of the casing and positioned for wiping contact by the mirror when the frame and mirror are moved to folded and extended positions, the mirror when extended being positioned to receive the illuminated reflection of the face of the user with the casing constituting a hand grip, and the frame being outwardly offset relative to the pivoted end thereof on the casing to provide a space for the mounting of the mirror and sheet of soft material.

4. A vanity mirror device comprising a casing containing illuminating means having a lamp exposed at the front of the casing adjacent one end thereof, a mirror having a pivotal mounting exteriorly of the casing on the rear wall thereof and at the end of the casing adjacent the lamp and movable in a plane parallel to the plane of the casing to occupy folded and extended positions, the mirror when extended being positioned to receive the illuminated reflection of the face of the user with the casing constituting a hand grip, and a sheet of soft material secured to the outer face of the rear wall of the casing and positioned for wiping contact by the mirror when the mirror is moved to folded and extended positions.

JOSEPH O. NEWELL.